(12) United States Patent
Eriyama et al.

(10) Patent No.: US 7,352,943 B2
(45) Date of Patent: Apr. 1, 2008

(54) OPTICAL POSITION SENSING COMPONENT, OPTICAL POSITION SENSING DEVICE, AND MANUFACTURING METHOD THEREOF

(75) Inventors: Yuichi Eriyama, Tokyo (JP); Jun Huangfu, Tokyo (JP); Yukio Maeda, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 11/702,606

(22) Filed: Feb. 6, 2007

(65) Prior Publication Data

US 2007/0189700 A1     Aug. 16, 2007

(30) Foreign Application Priority Data

Feb. 10, 2006     (JP) .............................. 2006-033695

(51) Int. Cl.
*G02B 6/10*     (2006.01)
(52) U.S. Cl. ...................................... 385/132; 264/1.24
(58) Field of Classification Search ................. 385/14, 385/132; 264/1.24
See application file for complete search history.

(56) References Cited

U.S. PATENT DOCUMENTS 5,972,564 A * 10/1999 Kawana et al. .......... 430/281.1

2005/0201681 A1     9/2005 Payne
2005/0271319 A1     12/2005 Graham
2005/0271326 A1 *  12/2005 Luo .............................. 385/43
2006/0002655 A1     1/2006 Smits

FOREIGN PATENT DOCUMENTS

WO     WO 2006/004775 A1     1/2006

* cited by examiner

*Primary Examiner*—Brian Healy
*Assistant Examiner*—Charlie Y Peng
(74) *Attorney, Agent, or Firm*—Oliff & Berridge, PLC

(57) ABSTRACT

An optical position sensing component includes an input light guiding portion and a received light guiding portion. The input light guiding portion is constituted by a polymer waveguide and inputs a light emitted from a near-infrared light-emitting source and outputs the light to a lens for collimate through a plurality of ends. The received light guiding portion is constituted by a polymer waveguide and inputs the light output from the light guiding portion and outputs the input light to a near-infrared light-receiving device. Further, the polymer waveguide has a core portion composed of a cured photosensitive resin composition.

5 Claims, 3 Drawing Sheets

OPTICAL POSITION SENSING COMPONENT, OPTICAL POSITION SENSING DEVICE, AND MANUFACTURING METHOD THEREOF

BACKGROUND OF THE INVENTION

1. Field of the Invention

The present invention relates to an optical position sensing component, an optical position sensing device, and a manufacturing method thereof.

2. Description of Related Art

A conventional position sensing component is formed by covering a film having a resistance, a capacity, or a film evaporated or coated with conductive material to a screen of a display. Such method is disclosed in U.S. Patent Application Publication No. 2006/002655, for example. However in this method, light intensity of the screen needs to be increased in order to get the intensity as usual because the screen is covered with the film that is not purposed for display. To increase the light intensity of the screen, amount of energy consumption increases.

However in a mobile information terminal and a notebook computer etc, such position sensing component is often used thereto, the amount of the battery that can be used is usually determined. Thus the position sensing device consuming a large energy is not preferred.

SUMMARY OF THE INVENTION

One of the purposes according to the present invention is to provide an optical position sensing component and an optical position sensing device, which uses waveguides having high photoconductivity, and a manufacturing method thereof.

According to an aspect of the present invention, there is provided an optical position sensing component that includes an input light guiding portion and a received light guiding portion. The input light guiding portion is constituted by a polymer waveguide and inputs a light emitted from a near-infrared light-emitting source and outputs the input light to a lens for collimate through a plurality of ends. The received light guiding portion is constituted by a polymer waveguide and inputs the light output from the input light guiding portion and outputs the input light to a near-infrared light-receiving device. A core portion constituting the polymer waveguide is a cured photosensitive resin composition in the input light guiding portion and the received light guiding portion.

According to another aspect of the present invention, there is provided an optical position sensing device that includes an input optical component and a light-receiving optical component disposed opposite to the input optical component over a plane substrate. The input optical component includes a near-infrared light-emitting source, a plurality of lenses for collimate, and an input light guiding portion. The input light guiding portion includes an end portion for inputting a light emitted from the near-infrared light-emitting source and a polymer waveguide having a plurality of ends for outputting the input light to the plurality of lenses for collimate. The light-receiving optical component includes a plurality of near-infrared light-receiving devices, and a received light guiding portion constituted by an end portion for inputting the light output from the input light guiding portion and a plurality of polymer waveguide having other ends for outputting the input light to the plurality of near-infrared light-receiving devices. Further, the polymer waveguide has a core portion composed of a cured photosensitive resin composition.

According to another aspect of the present invention, there is provided a method of manufacturing an optical position sensing device that includes manufacturing an input light guiding portion including a polymer waveguide having an end portion and a plurality of ends, and a received light guiding portion including a plurality of polymer waveguide (one or more), by curing a photosensitive resin composition, disposing a lens for optical collimate to the plurality of ends included in the input light guiding portion, disposing a near-infrared light-emitting source to the end portion, disposing a near-infrared light-receiving devices to the plurality of polymer waveguide constituting the received light guiding portion respectively.

Further, the photosensitive resin composition includes (A) an adduct composed of a copolymer containing at least a hydroxyalkyl (meth) acrylate and a (meth) acrylic acid as a monomer, and an isocyanate compound containing at least one (meth) acryloxy group in a molecule, (B) a compound containing at least one ethylene unsaturated group in a molecule (excluding (A) components), (C) a photopolymerization initiator.

Furthermore, the (A) components are an adduct composed of a copolymer containing at least one monomer selected from the group consisting of an ethylene unsaturated containing aromatics, a cycloaliphatic alkyl (meth) acrylate, and an alkyl (meth) acrylate that can be branched, a hydroxyalkyl (meth) acrylate as amonomer and a (meth) acrylic acid as amonomer, and an isocyanate compound containing at least one (meth) acryloxy group in a molecule.

According to the optical position sensing component, optical position sensing device, and the manufacturing method thereof in the present invention, the light coupling between the light-emitting portion and the light guiding portion, and between the light guiding portion and the light-receiving portion can be efficiently performed because the core portion of the light guiding portion is the cured photosensitive resin composition. Thus the optical position sensing device is able to detect a position with high sensitivity.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

Figure 1:
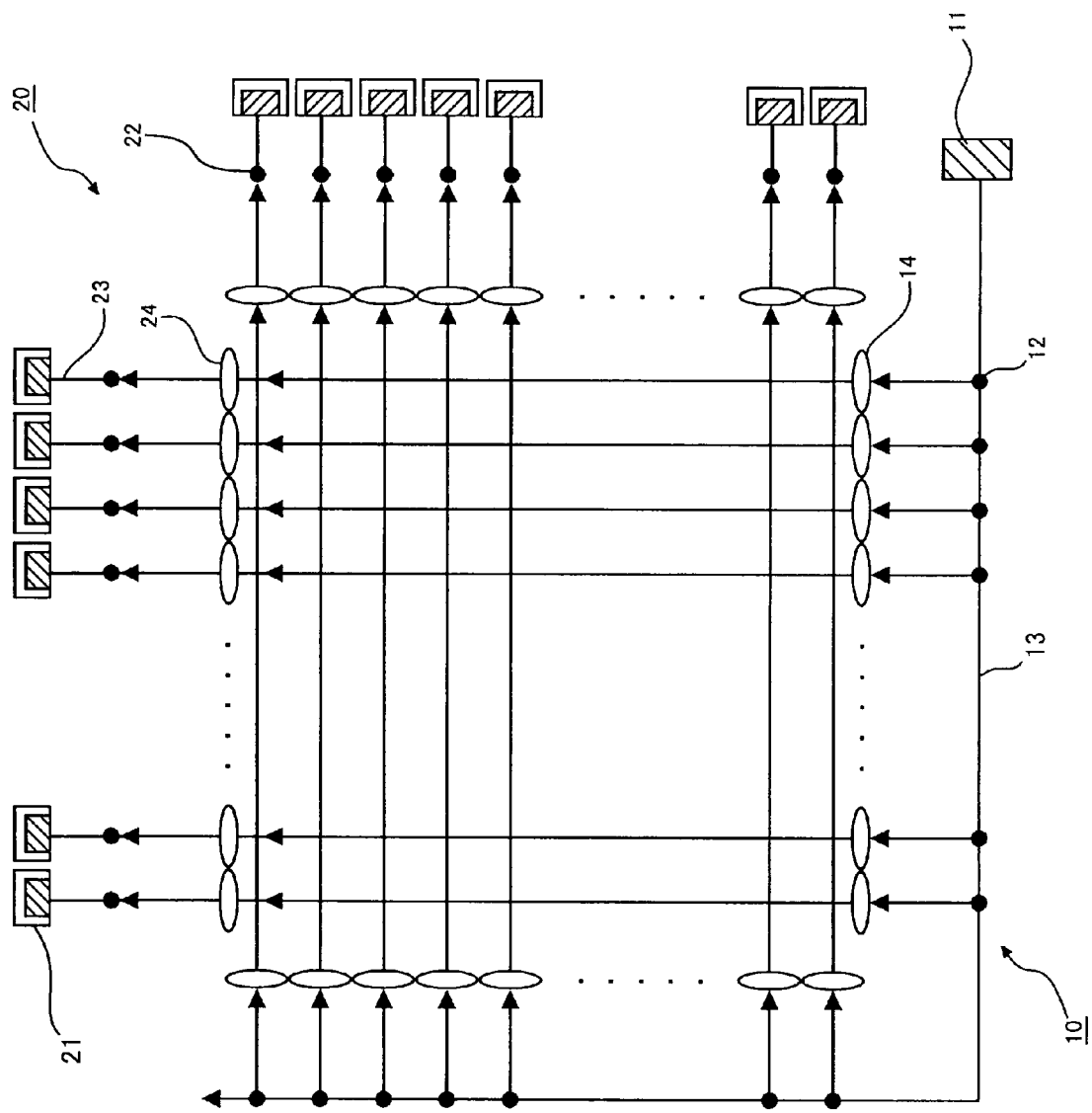
FIG. 1 is a structural schematic diagram showing an example of an optical sensing device according to an embodiment of the present invention.
Figure 2:
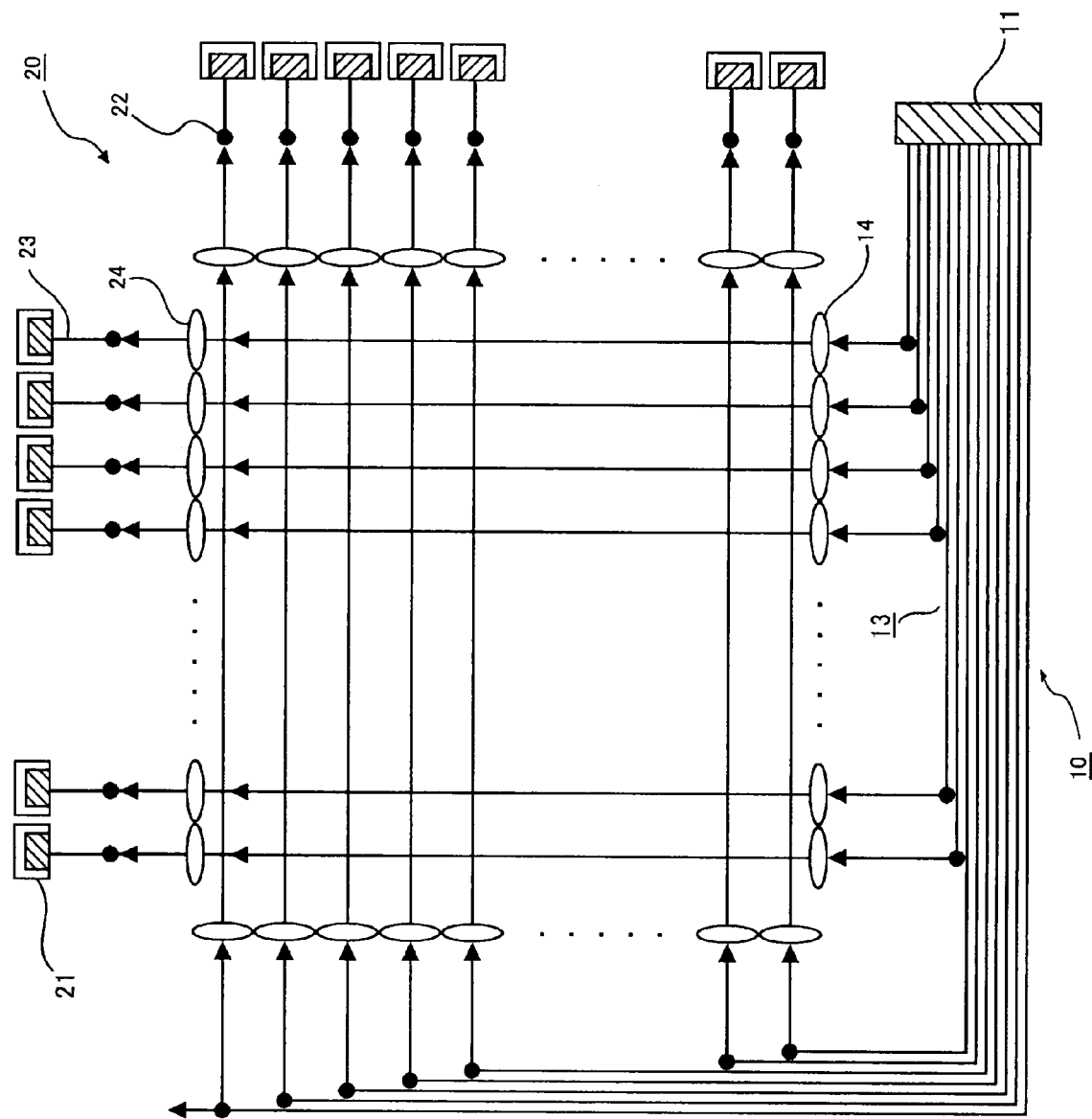
FIG. 2 is a structural schematic diagram showing another example of the optical sensing device according to the embodiment of the present invention.

This is an illustrative embodiment in which the present invention is applied to an optical position sensing device and a manufacturing method thereof. FIG. 1 is a structural schematic diagram showing an example of an optical sensing device according to an embodiment of the present invention. FIG. 2 is a structural schematic diagram showing another example the optical sensor according to the embodiment of the present invention.

The optical sensing device shown in FIG. 1 includes an input optical component 10 and a light-receiving optical component 20. The input optical component 10 includes a near-infrared light-emitting source 11, an input light guiding portion 13, and a plurality of lenses for collimate 14. The light-receiving optical component 20 includes a plurality of near-infrared light-receiving devices 21, received light guiding portions 23, and lenses for collimate 24. The input light guiding portion 13 includes light-emitting portions 12. The received light guiding portion 23 includes light-receiving portions 22. In the optical position sensing component shown in FIG. 1, each light-emitting portion 12 and each light-receiving portion 22 are formed by waveguide (a part of waveguide) that constitute each light guiding portion. The optical position sensing components (input light guiding portion 13 and the received light guiding portion 23) determine a position by whether a light from each light-emitting portion 12 reaches each light-receiving portion 22. The input optical component 10 inputs the light from each light-emitting portion 12 into the light guide. The light-receiving optical component 20 sends the light from the light guide to each light-receiving portion 22. Arrows in FIGS. 1 and 2 indicate light paths in light guide.

The input optical component 10 in the optical sensor component has a near-ultraviolet light-emitting source 11 disposed to an end (terminal) of a plane (substrate) and the lenses for collimate 14 to the ends of branches. For the light-emitting source 11, sapphire laser is used for example. The input optical component 10 takes a polymer waveguide with a structure branching into several waveguides as the input light guiding portion 13. For example the input light guiding portion 13 is formed of an end portion for inputting a light emitted in the near-infrared light-emitting source and the polymer waveguide (polymer light waveguide) having a plurality of ends that output the input light to the plurality of lenses for collimate 14. The light output from the light-emitting source 11 is branched and guided inside the waveguide. As shown in FIG. 1, the input light guiding portion 13 may guide the light from one light-emitting source 11 to each of the light-emitting portions 12. Alternatively as shown in FIG. 2, the input light guiding portion 13 may guide the light from the light-emitting source 11 directly branched to each of the light-emitting portions 12 branched.

The light-receiving optical component 20 in the optical position sensing component includes the near-infrared light-receiving devices 21 disposed thereto and the lenses for collimate 24 to ends of the branches. For the light-receiving device 21 here, photodiode is used for example. The light-receiving optical component 20 uses the plurality of the polymer waveguides (polymer light waveguides) as the received light guiding portion 23. For example the received light guiding portion 23 is formed of a plurality of polymer waveguides having ends for inputting the light output from the input light guiding portion and other ends for outputting the input light to the plurality of near-infrared light-receiving devices 21. The light-receiving devices 21 are provided to each of the polymer waveguides as shown in FIG. 1. This enables the light-receiving devices 21 to recognize the position.

Further, the input optical component 10 and the light-receiving optical component 20 are disposed opposite to each other over a plane substrate. Thus the input light guiding portion 13 and the received light guiding portion 23 are disposed opposite to each other. For example if the input optical component 10 is disposed along the leftmost and bottom of the optical position sensing component, the light-receiving optical component 20 is disposed along the rightmost and top of the optical position sensing device.

FIGS. 1 and 2 show a case in which the lenses for collimate 24 are disposed. However the lenses for collimate 24 are not necessarily disposed. If the light reaching from the lenses for collimate 14 that are disposed to the input optical component 10 enters almost linearly to the received light guiding portion 23, the light output from the light-emitting portion 12 reaches to the light-receiving portion 22. Accordingly the optical position sensing device is able to function without the lenses for collimate 24 being disposed thereto.

The polymer waveguide is disposed in a way that the core portion is interleaved between the lower and upper clad layers. The characteristic of the polymer waveguide is that relative index difference between the core portion and the clad layer is from 1% to 4%.

In the optical position sensing component of this embodiment, the core portion constituting the polymer waveguide is cured photosensitive resin composition including (A) an adduct composed of a copolymer of at least hydroxyalkyl (meth) acrylate and (meth) acrylic acid, and an isocyanate compound containing at least one (meth) acryloxy group in a molecule, (B) a compound containing at least one (meth) acryloyl group in a molecule (excluding (A) components), and (C) a photopolymerization initiator.

For high quality of waveguide, the copolymer to produce (A) components is preferably copolymerized of ethylene unsaturated containing aromatics, cycloaliphatic alkyl (meth) acrylate, or alkyl (meth) acrylate etc that can be branched. When using it to the clad layer, (meth) acrylic acid is not required to be copolymerized because alkali developability does not have to be provided.

The photosensitive resin composition may be dissolved in an organic solvent (ethyl lactate, propylene glycol monomethyl ether, propylene glycol monoethyl ether, methyl isobutyl ketone, methyl amyl ketone). The viscosity of the composite is preferably from 200 mPa s (milli pascal second) to 2000 mPa s or less in 25° C. Additionally, polymerization inhibitor, sensitizer, and surfactant may be added as necessary.

Further, the physical properties of the cured photosensitive resin forming the core portion is preferably that the refractive index with wavelength 824 nm (25° C.) is from 1.51 to 1.56 or less, and the material loss is from 0.05 dB/cm to 0.30 dB/cm, and the glass-transition temperature is from 55° C. to 180° C.

Figure 3:
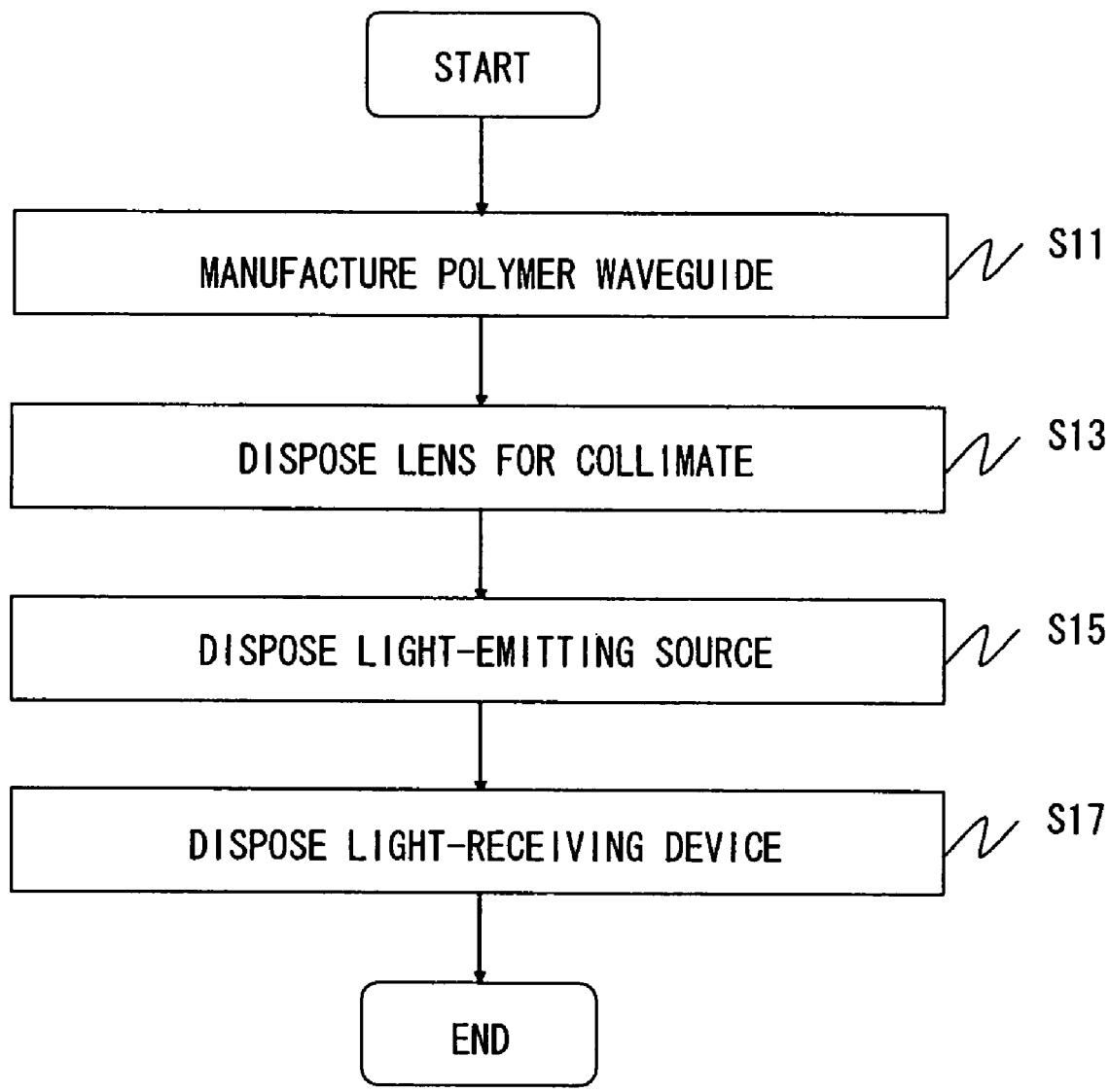
FIG. 3 is a flowchart showing an example of a manufacturing method of the optical sensing device according to the embodiment of the present invention.

A manufacturing method of the optical position sensing device is described hereinafter in detail. FIG. 3 is a flowchart showing an example of a manufacturing method of the optical position sensing device.

Firstly the input light guiding portion 13 constituted by the polymer waveguide having one end portion and a plurality of ends, and the received light guiding portion 23 constituted by a plurality of polymer waveguides having two ends are manufactured by curing photosensitive resin composition (S11). Next, the lenses for collimate 14 are disposed to the plurality of ends included in the input light guiding portion 13 (S13). Then, the near-infrared light-emitting source 11 is disposed to the end (portion) (S15). The near-infrared light-receiving devices 21 are disposed to other ends of the plurality of polymer waveguides constituting the received light guiding portions 23 respectively (S17).

This is how the optical position sensing device having the input optical component 10 and the light-receiving optical component 20 is manufactured. Details of the manufacturing method of the photosensitive resin composition are described hereinafter in detail using the illustrative embodiment. FIG. 3 is a view showing an example of the manufacturing method of the optical position sensing device but the method is not limited to this procedure.

FIRST EXAMPLE

After purging a flask having a dry ice/methanol refluxer with nitrogen, 2,2'-azobisisobutyronitrile 3 g as photopolymerization initiator and propylene glycol monomethyl ether acetate 115 g as organic solvent are added and stirred until the photopolymerization initiator is dissolved. Next, hydroxyethyl methacrylate 20 g, dicyclopentanyl Methacrylate_10 g, styrene 25 g, mathacrylic acid 10 g, and n-butyl acrylate 35 g are added and slowly started to stir. Then, the temperature of the solution is increased to 80° C. and polymerized at this temperature for 6 hours.

Subsequently, dilauryl acid di-n-butyl tin 0.13 g and 2,6-di-t-butyl-p-cresol 0.05 g are added in the resultant solution, and 2-methacryloxy ethyl isocyanate 23.7 g is dropped while stirring so that the temperature is kept 60° C. or less. After completing to drop, let it react for 5 hours in 60° C. to get polymer solution having mathacrylic group in the side chain. After that, the reaction product is dropped into mass volume hexane to precipitate the reaction product. Further, it is dissolved in tetrahydrofuran of same mass and precipitated again by mass volume hexane. After repeating the dissolving and coagulation processes for 3 times, the resultant coagulation is dried in vacuum at 40° C. for 48 hours to get a desired polymer A-1.

The composite for core is prepared by mixing evenly the above polymer A-1 100 g, tribromo phenol ethoxy acrylate (made by Dai-ichi Kogyo Seiyaku Co., Ltd., New Frontier BR-31) 30 g, photo-radical polymerization initiator ("Iregacure369" made by Chiba Specialty Chemicals) 3 g, and ethyl lactate 110 g. Furthermore, the composite for clad is prepared by mixing evenly the above polymer A-1 100 g, trimethylolpropanetriacrylate (made by Osaka Organic Chemical industry Ltd., TMP3A) 30 g, photo-radical polymerization initiator ("Iregacure369" made by Chiba Specialty Chemicals) 3 g, and ethyl lactate 110 g.

(a) Form the lower clad layer

The composite for clad is applied over the surface of a substrate by a slit coater and it is prebaked in an oven for 60 minutes at 100° C. to form a film. Then an ultraviolet of the wavelength 365 nm and illuminance 10 mW/cm$^2$ is irradiated to the film made from the composite for clad for 10 seconds to photo cure so as to form the lower clad layer having the thickness 50 μm.

(b) Form the core portion

Next, the composite for core is applied by the slit coater to form a film over the lower clad layer. The formed film is prebaked in the oven for 60 minutes at 100° C. to form a film having the thickness 50 μm. Then an ultraviolet of the wavelength 365 nm and illuminance 10 mW/cm$^2$ is irradiated to the film via a photomask having a predefined pattern for 100 seconds to cure the film. After that, the substrate having the cured film is immersed into developer made from 2.38% by weight tetramethylammonium Hydroxide water solution for 5 minutes to dissolve an unexposed portion of the film. After rinsing the substrate is in running water for 2 minutes, it is dried to form the core portion. The core portion is made by an alkali developing type of a photolithography method that the film is exposed and developed in the alkali developer.

(c) Form the upper clad layer

Next, the composite for clad is applied by the slit coater to form a film over the lower clad layer having the core portion and the film is prebaked in the oven for 60 minutes at 100° C. Then an ultraviolet of the wavelength 365 nm and illuminance 10 mW/cm$^2$ is irradiated to the film for 100 seconds to form the film.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical position sensing component comprising:
   an input light guiding portion constituted by a polymer first waveguide for inputting a light emitted from a near-infrared light-emitting source and outputting the light to a plurality of lenses for collimate through a plurality of ends; and
   a received light guiding portion constituted by a plurality of polymer second waveguides for inputting the light output from the input light guiding portion and outputting the input light to a near-infrared light-receiving device,
   wherein the polymer first waveguide and polymer second waveguides have a core portion composed of a cured photosensitive resin composition,
   the photosensitive resin composition including
   (A) an adduct of a copolymer containing at least a hydroxyalkyl (meth) acrylate and a (meth) acrylic acid as a monomer, and an isocyanate compound containing at least one (meth) acryloxy group in a molecule;
   (B) a compound containing at least one ethylene unsaturated group in a molecule (excluding (A) components); and
   (C) a photopolymerization initiator.

2. The optical position sensing component according to claim 1, wherein the (A) components are an adduct composed of
   a copolymer containing at least one monomer selected from the group consisting of an ethylene unsaturated containing aromatics, a cycloaliphatic alkyl (meth) acrylate, and an alkyl (meth) acrylate that can be branched, a hydroxyalkyl (meth) acrylate as a monomer and a (meth) acrylic acid as a monomer, and
   an isocyanate compound containing at least one (meth) acryloxy group in a molecule.

3. An optical position sensing device comprising:
   an input optical component; and
   a light-receiving optical component disposed opposite to the input optical component over a plane substrate,
   wherein the input optical component comprises:
   a near-infrared light-emitting source;
   a plurality of lenses for collimate; and an input light guiding portion including an end portion for inputting a light emitted from the near-infrared light-emitting source and a polymer first waveguide having a plurality of ends for outputting the input light to the plurality of lenses for collimate, wherein the light-receiving optical component comprises:

a plurality of near-infrared light-receiving devices; and a received light guiding portion including an end portion for inputting the light output from the input light guiding portion and a plurality of polymer second waveguides having other ends for outputting the input light to the plurality of near-infrared light-receiving devices, and wherein the polymer first waveguide and the plurality of polymer second waveguides have a core portion composed of a cured photosensitive resin composition, the photosensitive resin composition including (A) an adduct of a copolymer containing at least a hydroxyalkyl (meth) acrylate and a (meth) acrylic acid as a monomer, and an isocyanate compound containing at least one (meth) acryloxy group in a molecule;

(B) a compound containing at least one ethylene unsaturated group in a molecule (excluding (A) components); and (C) a photopolymerization initiator.

4. A method of manufacturing an optical position sensing device comprising:

manufacturing an input light guiding portion constituted by a polymer first waveguide including an end portion and a plurality of ends, and a received light guiding portion constituted by a plurality of polymer second waveguides, by curing a photosensitive resin composition;

disposing a lens for optical collimate to the plurality of ends included in the input light guiding portion;

disposing a near-infrared light-emitting source to the end portion; and disposing near-infrared light-receiving devices to the plurality of polymer second waveguides constituting the received light guiding portion respectively, wherein the photosensitive resin composition includes (A) an adduct of a copolymer containing at least a hydroxyalkyl (meth) acrylate and a (meth) acrylic acid as a monomer, and an isocyanate compound containing at least one (meth) acryloxy group in a molecule;

(B) a compound containing at least one ethylene unsaturated group in a molecule (excluding (A) components); and (C) a photopolymerization initiator.

5. The method of manufacturing the optical position sensing device according to claim 4, wherein in the manufacture of the photosensitive resin composition by curing, the core portion constituting the polymer first waveguide and the plurality of polymer second waveguides are manufactured in an alkali developing type of a photolithography method.

* * * * *